United States Patent [19]
Tanji et al.

[11] Patent Number: 4,748,814
[45] Date of Patent: Jun. 7, 1988

[54] ELECTRIC POWER GENERATING PLANT

[75] Inventors: Junichi Tanji, Katsuta; Mitsuo Kinoshita, Hitachi, both of Japan

[73] Assignee: Hitachi, Ltd., Tokyo, Japan

[21] Appl. No.: 876,769

[22] Filed: Jun. 20, 1986

[30] Foreign Application Priority Data

Jul. 5, 1985 [JP] Japan ................. 60-146569

[51] Int. Cl.[4] ............................. F01K 11/00
[52] U.S. Cl. ............................ 60/664; 60/660; 60/644.1; 376/216
[58] Field of Search ................ 60/644.1, 652, 660, 60/664, 667, 689; 376/215, 216, 217

[56] References Cited

U.S. PATENT DOCUMENTS

| | | |
|---|---|---|
| 3,630,839 | 12/1971 | Podolsky ................ 60/652 X |
| 4,188,792 | 2/1980 | Schaible ................ 60/660 |
| 4,329,592 | 5/1982 | Wagner et al. ............ 60/660 X |
| 4,424,186 | 1/1984 | Cook ..................... 376/217 X |

*Primary Examiner*—Stephen F. Husar
*Attorney, Agent, or Firm*—Antonelli, Terry & Wands

[57] ABSTRACT

A control apparatus for electric power plant comprises turbine speed control means for detecting the speed of a turbine coupled to an electric generator to control the turbine speed by controlling a steam flow supplied to the turbine on the basis of the detected speed, pressure control means for controlling the pressure in a steam generator on the basis of the pressure of the steam generator, and correcting means for correcting the steam flow supplied to the turbine only when fluctuation in the pressure of the steam generator brought about by rapid change of a set load value is deviated from a predetermined range in which the steam pressure is allowed to vary, the correction of the steam flow being made in correspondence to the deviation.

11 Claims, 10 Drawing Sheets

ELECTRIC POWER GENERATING PLANT

BACKGROUND OF THE INVENTION

1. Field of the Invention

The present invention generally relates to a control apparatus for an electric power generating plant, and more particularly to a control apparatus for a power plant in which electric power is generated by utilizing vapor or steam produced by a steam generator (e.g. a reactor vessel in the case of a boiling water reactor or BWR, a steam generator in the case of a pressurized water reactor or PWR, a boiler in the case of a thermal power plant and so forth).

2. Description of the Related Art

As a control apparatus for a nuclear power plant and especially for a BWR nuclear power plant, there has been known a one which is primarily designed for performing a smooth load following control by coordinating harmonically the power control of the nuclear reactor with the generator output control in response to a demand for a relatively small and rapid change in the load of an associated power system, as is disclosed, for example, in Japanese Unexamined Patent Publication No. 131799/1980. According to this prior proposal, a load change demand signal produced by a turbine speed controller in correspondence to a change in frequency of the power system is added to a total steam flow demand signal produced by a pressure controller for thereby responding rapidly to the load change demand of the power system while controlling the reactor pressure to be stable. It is considered that this control approach can ensure improved power responsive control characteristics in the operation control system for the existing BWR nuclear power plant which is primarily directed to the power control of the nuclear reactor.

In the future, however, it is expected that the necessity will arise for such an operation control system which is designed primarily for the maintenance of the system frequency as the nuclear power plant occupies increasingly a greater proportion of the power supply source in the power system. In that case, a so-called governor-free operation will be required in which the generator output (turbine speed) is directly controlled as a function of change or variation in the frequency of the power system connected to the generator. In the governor-free operation, the steam flow control valve for controlling the steam flow fed to the turbine does not participate in the pressure control operation for suppressing fluctuation in the reactor pressure so far as magnitude of such fluctuation remains within a permissible range but performs the control operation only for the fluctuation of the turbine speed, i.e. the change in the system frequency. In this connection, it is noted that the control system according to the prior proposal mentioned above exhibits the control characteristics in which the change or fluctuation in the reactor pressure is always reflected and thus the response speed of this system is considered to be very low when compared with the response speed attained with the aforementioned governor-free operation.

SUMMARY OF THE INVENTION

It is therefore an object of the present invention to provide a control apparatus for a power plant which can realize improved response characteristics provided by the governor-free operation for a demand for relatively small and rapid change in load of a power system and which is capable of controlling the pressure and the output of the steam generator to be stable even when there arises a demand for relatively large change in load of the electric power system.

In view of the above and other objects which will become more apparent as description proceeds, there is provided according to an aspect of the present invention a control apparatus for an electric power generating plant which apparatus comprises a control unit including a pressure controller having an input supplied with an output signal produced by a pressure gauge adapted to measure steam pressure for thereby outputting a first control signal for controlling the opening degree of a bypass valve, a turbine speed controller having an input supplied with an output signal produced by a rotating speed detecting means and outputting a second control signal, and correcting means for producing a third control signal for controlling the opening degree of a steam flow control valve by correcting the second control signal with the first control signal. The control apparatus further comprises a steam generator output controlling means for controlling the output of a steam generator on the basis of the first control signal.

A full understanding of the invention can be gained from the following description read in conjunction with the attached drawings.

DESCRIPTION OF THE PREFERRED EMBODIMENTS

In the course of the following description, reference is made to the drawings.

Figure 1:
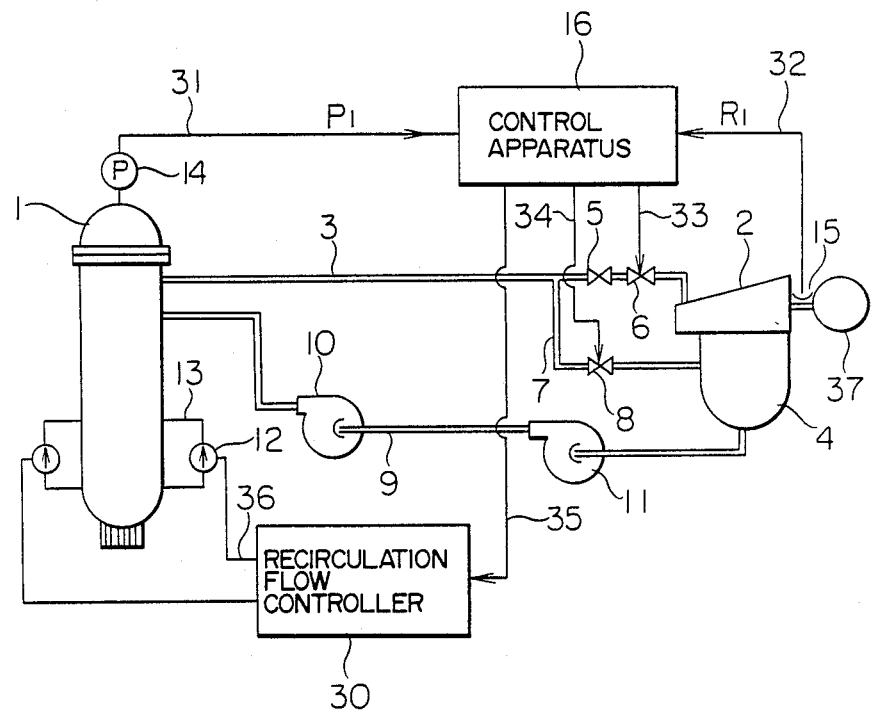
FIG. 1 is a view showing a general arrangement of an electric power generating plant incorporating a control apparatus according to an exemplary embodiment of the present invention.
Figure 2:
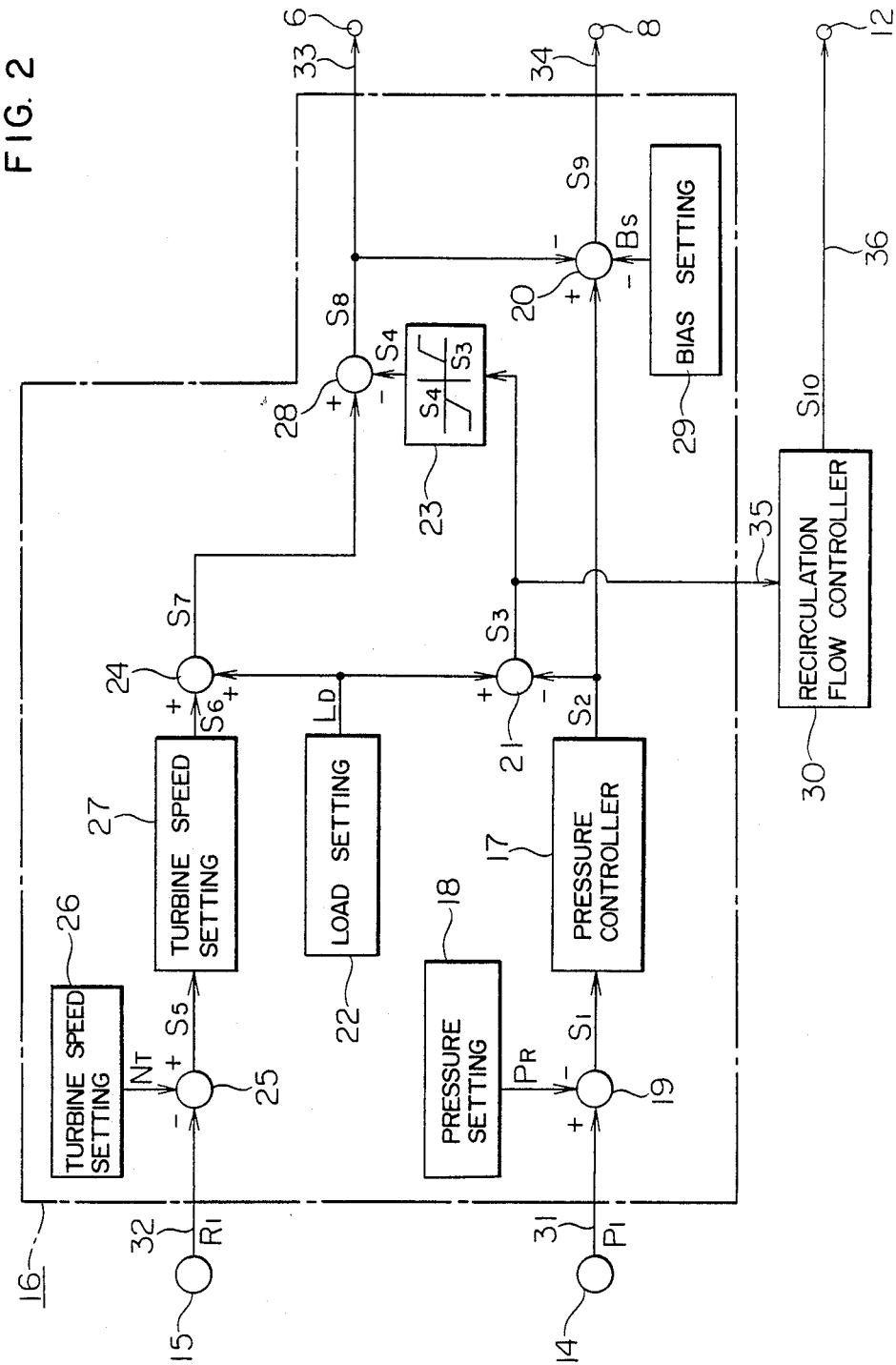
FIG. 2 is a view showing in a block diagram a structure of the controlling apparatus according to an embodiment of the invention.

Now, referring to FIGS. 1 and 2, there is shown an exemplary embodiment of the present invention which is applied to a power plant control system for a boiling water reactor or BWR power plant. It will be noted that in the case of the BWR power plant, the BWR pressure vessel corresponds to the steam generator.

Referring to the drawings, the BWR pressure vessel 1 is connected to a turbine 2 through a main steam pipe 3 which is equipped with an intercept or throttle valve 5 and a turbine control valve 6. A condenser 4 is provided on the exhaust side of the turbine 2. A bypass pipe 7 connected to the main steam pipe 3 at a location upstream of the intercept valve 5 is connected to the condenser 4, which in turn is communicated with the reactor pressure vessel 1 through a feed water pipe 9. A feed water pump 10 and a condensate pump 11 are installed in the feed water pipe 9. Although not shown in the figures, a demineralizer and low and high pressure feed water heaters are provided in association with the feed water pipe 9.

A reactor circulating pump (also referred to as recirculation pump) 12 is installed in a recirculation pipe 13 connected to the reactor pressure vessel 1. An electric generator 37 is operatively coupled to the turbine 2.

A pressure gauge 14 for detecting a steam pressure is mounted on the pressure vessel 1. A speed indicator or tachometer 15 serves to detect the rotating speed (the number of rotations) of the turbine 2. The pressure gauge 14 is electrically connected to the control apparatus 16 through a wiring conductor 31. Similarly, the tachometer 15 is also connected to the control apparatus 16 through an electrical conductor 32. Further, the turbine control valve 6 and the bypass valve 8 are electrically connected to the control apparatus 16 through wirings 33 and 34, respectively. A recirculation flow control apparatus 30 is electrically connected to the control apparatus 16 through a wiring conductor 35 on one hand and to the reactor circulating pump 12 through a wiring conductor 36 on the other hand.

FIG. 2 shows in detail a structure of the control apparatus 16. As will be seen, the control apparatus 16 includes as main components thereof a pressure controller 17, a dead-band limiter 23, a turbine speed controller 27 and an adder 28. The pressure controller 17 is connected to the pressure gauge 14 by a wiring conductor 31 through an adder 19. The turbine speed controller 27 is connected to the tachometer 11 by a wiring conductor 32 through an adder 25. The dead-band limiter 23 connected to the pressure controller 17 through an adder 21 is also connected to the adder 28 which in turn is connected to the turbine speed controller 27 through an adder 24 and additionally connected to the steam control valve 6 by a wiring line 33. An adder 20 is connected to the pressure controller 17 and additionally connected to the bypass valve 8 (which is normally closed) by means of a wiring line 34.

With the structure of the control apparatus for the BWR power plant described above, operation of the system will be elucidated below.

A coolant or water is introduced into the reactor core disposed within the pressure vessel 1 of the nuclear reactor by driving the reactor circulating pump 12. In the course of flowing through the reactor core, the coolant is heated to be transformed to steam. The steam thus generated is supplied to the turbine 2 from the reactor vessel 1 by way of the main steam pipe 3. In the normal operation of the plant, the bypass valve 8 is closed. The turbine 2 is driven by the steam as supplied, to thereby rotate the rotor of the electric generator 36. The steam discharged from the turbine 2 is condensed to water in the condenser 4. The condensate is pumped up by the condensate pump 11 and the feed water pump 10 to be again fed to the reactor pressure vessel 1 through the feed water pipe 9.

A pressure signal $P_1$ representative of a measured value of the steam pressure (in the case of the instant embodiment, the steam pressure within the reactor pressure vessel 1) as measured by the pressure gauge 14 is applied to an input of the adder 19. On the other hand, a turbine speed signal $R_1$ representative of a measured value of the turbine speed produced by the tachometer 15 is supplied to an input of the adder 25.

The adder 19 has an other input supplied with a pressure setting signal $P_R$ representative of the desired or requisite pressure value outputted by a pressure setting unit 18 to thereby produce a deviation signal $S_1$ representing difference between the actual pressure signal $P_1$ and the desired pressure signal $P_R$, the deviation signal $S_1$ being then inputted to the pressure controller 17 where the deviation signal $S_1$ undergoes compensation for the lead or lag and is subsequently multiplied with the reciprocal of a pressure regulation factor to derive a total steam flow demand signal $S_2$, as is known in the art. With the phrase "pressure regulation factor", it is intended to represent the pressure deviation required to increase the steam flow through the turbine control valve 6 from 0% to 100% in terms of percentage of the rated pressure. The total steam flow demand signal $S_2$ thus produced is applied to an input of the adder 20 and additionally to an input of the adder 21. The adder 21 has the other input supplied with a load setting signal $L_D$ outputted by a load setting unit 22 and representative of the load to be set in percentage of the rated value, to thereby output a deviation signal $S_3$ representative of the difference between the load setting signal $L_D$ and the total steam flow demand signal $S_2$. The deviation signal $S_3$ is transmitted to the recirculation flow controller 30 as a load following signal which follows up the set load and additionally supplied to the dead-band limiter 23.

In the recirculation flow controller 30, the load following signal $S_3$ as inputted undergoes proportional and integral operation, whereby a recirculation pump speed demand signal $S_{10}$ is produced as the output signal. A motor control circuit (not shown) of the recirculation pump (also referred to as the reactor circulating pump) 12 is supplied with the recirculation pump speed demand signal $S_{10}$ to control the rotational number of the pump motor in dependence on the signal $S_{10}$. As the rotational number or speed of the pump motor is controlled, the coolant flow discharged from the recirculation pump 12 is correspondingly increased or decreased, resulting in that the flow of the coolant supplied to the reactor core (also referred to as the core flow) is increased or decreased. The increasing or decreasing in the core flow is accompanied by increasing or decreasing in the output power in the case of the BWR power plant. In this way, the recirculation flow controller 30 serves to control the reactor power. In this connection, it is to be noted that the adjustment or regulation of the core flow of the coolant can be made more finely than that of the control rods. Thus, it is safe to say that the recirculation flow controller 30 constitutes control means for fine adjustment of the reactor power.

The adder 25 has the inputs supplied, respectively, with the turbine speed signal $R_1$ and a speed setting signal $N_T$ produced by the turbine speed setting unit 26, to thereby produce at the output a deviation signal $S_5$ representative of the difference between the signals $R_1$ and $N_T$. Parenthetically, the values set at the pressure setting unit 18 and the turbine speed setting unit 26, i.e. the pressure setting signal $P_R$ and the speed setting signal $N_T$ mentioned above, are commanded from a central control station (not shown). Similarly, the load setting signal $L_D$ of the load setting unit 22 is commanded from the central control station. In the turbine speed controller 27, the deviation signal $S_5$ inputted thereto is multiplied with the reciprocal of the speed regulation factor, whereby a load change demand signal $S_6$ is produced, as is known in the art. With the phrase "speed regulation factor", it is intended to represent magnitude of the speed deviation signal required to change the steam flow through the turbine control valve 6 from 100% to 0% in terms of percentage of the rated speed. The load change demand signal $S_6$ is inputted to the adder 24, through which the load change demand signal $S_6$ is added with the load setting signal $L_D$, whereby a load demand signal $S_7$ is produced by the adder 24. The load demand signal $S_7$ is inputted to the adder 28 which has the other input supplied with the output signal $S_4$ from the dead-band limiter 23. The adder 28 functions to correct the load demand signal $S_7$ on the basis of the signal $S_4$ to derive a turbine control valve opening demand signal $S_8$ as the output signal. In this manner, the load demand signal $S_7$ is corrected by the adder 28.

In response to the turbine control valve opening demand signal $S_8$, the opening degree of the turbine control valve 6 is adjusted. As the result, the flow of the steam supplied to the turbine 2 is regulated, which in turn means that the rotating speed of the turbine 2 can be adjusted or regulated in dependence on the change in the load of the power system.

The dead-band limiter 23 is supplied with the load following signal $S_3$ mentioned hereinbefore to produce the signal $S_4$. More specifically, when the deviation signal $S_3$ falls within a predetermined deadband width, the signal $S_4$ of zero level is outputted by the limiter 23, while the signal $S_4$ of a predetermined level is outputted when the deviation signal $S_3$ is outside of the dead-band width. The characteristics of the dead-band limiter is schematically illustrated within the block 23 in FIG. 2. The dead-band width of the limiter 23 is determined on the basis of the magnitude of permissible fluctuation in the same pressure. More specifically, when the range within which the steam pressure is allowed to change is represented by $\Delta P_L$ with the pressure regulation factor being represented by $k_p$, the width $D_B$ of the dead-band then can be given by the following expression:

$$D_B = \frac{\Delta P_L}{k_p} \quad (1)$$

By using the dead-band limiter 23 having the dead-band width $D_B$, the governor-free operation can be satisfactorily realized when the change or fluctuation in the steam pressure within the reactor vessel 1 lies within the range of permissible values, while the pressure control becomes effective in addition to the load control when the fluctuation in the steam pressure goes outside of the above range, whereby the fluctuation in the reactor pressure can be suppressed to a minimum.

A bypass valve opening demand signal $S_9$ is outputted by the adder 20. The adder 20 is supplied as the inputs thereto the total steam flow demand signal $S_2$, the steam control valve opening demand signal $S_8$ and a valve opening bias signal $B_S$ produced by a bias setting unit 29 and representative of the bias value applied to the bypass valve 12 in the closing direction for preventing the chattering. In the adder 20, the signals $S_8$ and $B_S$ are subtracted from the signal $S_2$, whereby the bypass valve opening demand signal $S_9$ is produced. In response to the input bypass valve opening demand signal $S_9$, the opening degree of the bypass valve 8 is correspondingly controlled. When the bypass valve 8 is opened, a corresponding proportion of the steam generated in the reactor pressure vessel 1 can flow into the condenser 4 by way of the bypass pipe 7. In other words, when the turbine control valve 6 is not opened to the extent required for passing therethrough the main steam flow corresponding to the total steam flow demand signal $S_2$, the bypass valve 8 is opened to allow the amount of steam in excess to flow into the condenser 4 for thereby preventing an excessive amount of steam from being supplied to the turbine 2 under the excessively high pressure prevailing within the reactor pressure vessel 1.

As will now be appreciated, according to the illustrated embodiment, the control of the rotating speed of the turbine 2, i.e. the output of the electric generator, can be performed in dependence on the change in frequency of the power system. It is noted that the response characteristic in the governor-free operation mode is significantly improved by virtue of such feature that the control of the opening degree of the steam control valve 6 is effected on the basis of the output signal of the pressure controller 17 caused to pass through the dead-band limiter 23 and the output signal of the turbine speed controller 27. In particular, in the case of the instant embodiment of the invention applied to the BWR nuclear power plant, the pressure within the steam generator, i.e. the pressure within the reactor, can be retained within the range of permissible values, whereby the change or variation in the reactor power can be satisfactorily suppressed in the course of the governor-free operation. In general, in the case of the BWR nuclear reactor, when the pressure within the reactor changes rapidly or abruptly, the void coefficient of the core increases or decreases rapidly, being accompanied with rapid change in the neutron flux and hence the reactor power. In contrast, according to the teachings of the present invention illustrated above, the change or fluctuation in pressure within the pressure vessel 1 and hence the fluctuation in the reactor power can be suppressed to a minimum.

Figure 3:
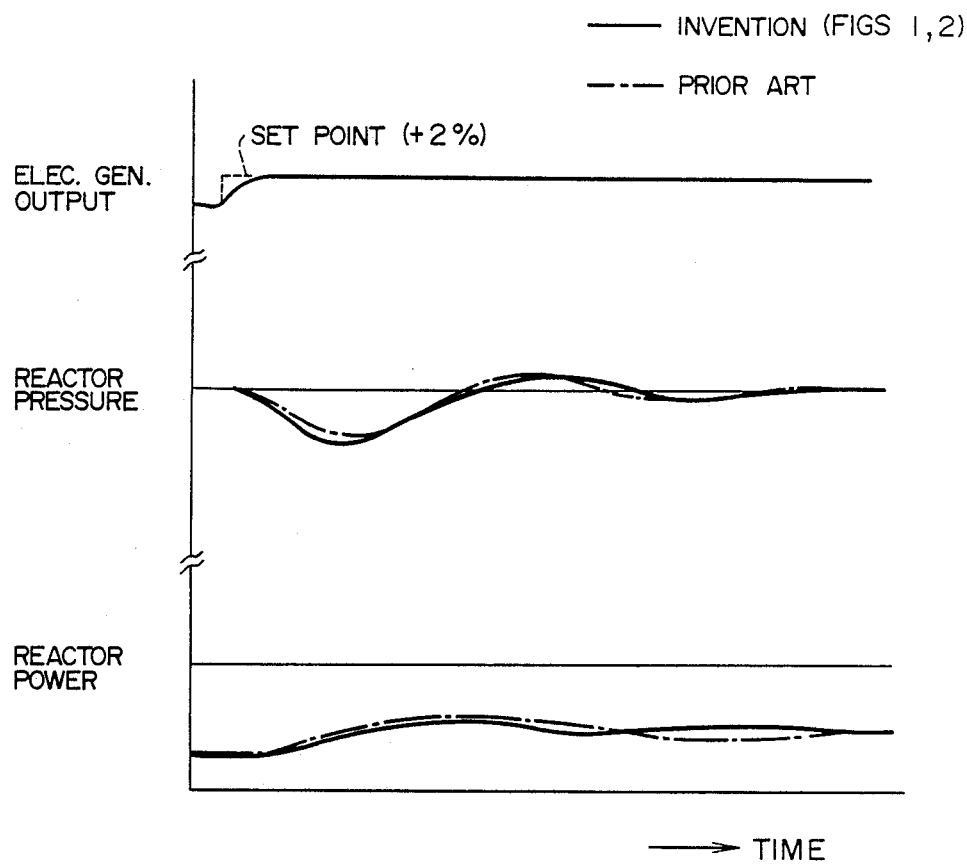
FIGS. 3 and 4 are views for graphically illustrating control characteristics of the control apparatus according to the invention shown in FIG. 2 in a governor-free operation mode in comparison with those of the hitherto known control apparatus.
Figure 4:
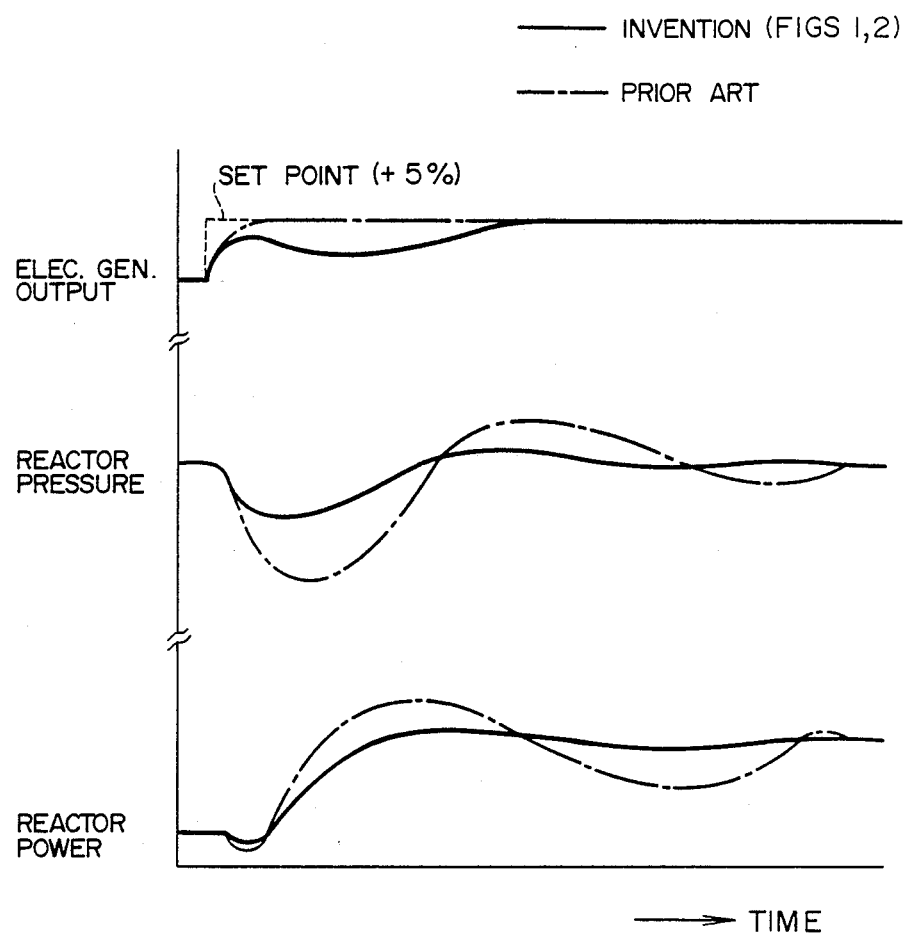

The typical control characteristics of the control apparatus described above will be elucidated comparatively with those of the hitherto known apparatus by referring to FIGS. 3 and 4. In the figures, the characteristics of the present embodiment are illustrated by solid line curves, while those of the prior art apparatus are illustrated by dotted broken lines. More specifically, FIGS. 3 and 4 illustrate graphically the control characteristics of the control apparatus for the BWR power plant upon changing of the load setting point by the load setting unit 22 corresponding to the change or variation in the frequency of the power system.

As will be seen in FIG. 3, when magnitude of the change in the load is +2% and thus can be dealt with the ordinary governor-free operation (i.e. when the change lies within the width of the dead band of the dead-band limiter 23), fluctuation in the reactor pressure and the reactor power become soon stabilized, converging to a certain level within a short time under the control of the apparatus according to the embodiment described above. Essentially, the same holds true in the case where the prior art apparatus is employed.

In contrast, FIG. 4 illustrates graphically the fluctuations in the reactor pressure and the reactor power in the case where the change in the load is as great as +5%. In the hitherto known governor-free control operation, the turbine output varies in following up the change of the setting point. However, when the magnitude of change of the setting point is great, the fluctuation of the reactor pressure becomes correspondingly great, as the result of which overshoot of the reactor power (represented by a thermal flux equivalent signal derived by passing the neutron flux signal through a delay element of the first order) becomes increased. As a consequence, a lot of time is required for these fluctuations to converge to a certain stable level. This can be explained by the fact that the main steam flow undergoes abrupt or rapid fluctuation in following up the change of the setting point within such a short time interval which is insufficient for the reactor output to follow up the change in the load. However, according to the teaching of the invention realized in the embodiment described above, when the reactor pressure tends to decrease below the permissible range of the pressure variation, the output signal of the pressure controller 17 becomes effective to correctively suppress the change in the opening degree of the steam flow control valve 6 as brought about by the output signal of the turbine speed controller 27, whereby decreasing in the reactor pressure can be made significantly small, as compared with the case of the hitherto known governor-free control operation. More specifically, the magnitude of fluctuation in the reactor pressure is suppressed to a half of what can be attained with prior art governor-free control operation. Although the initial response of the generator output is consequently slow, the time taken for the reactor pressure and the reactor power to converge to a stable level can be remarkably shortened according to the illustrated embodiment of the invention when compared with the prior art control procedure.

It should be mentioned that the governor-free operation can also be realized even when the dead-band limiter 23 is omitted and the deviation signal $S_3$ produced by the adder 21 is directly inputted to the adder 28. In that case, however, the response characteristics of the governor-free operation become degraded more or less when compared with the aforementioned embodiment.

Figure 5:
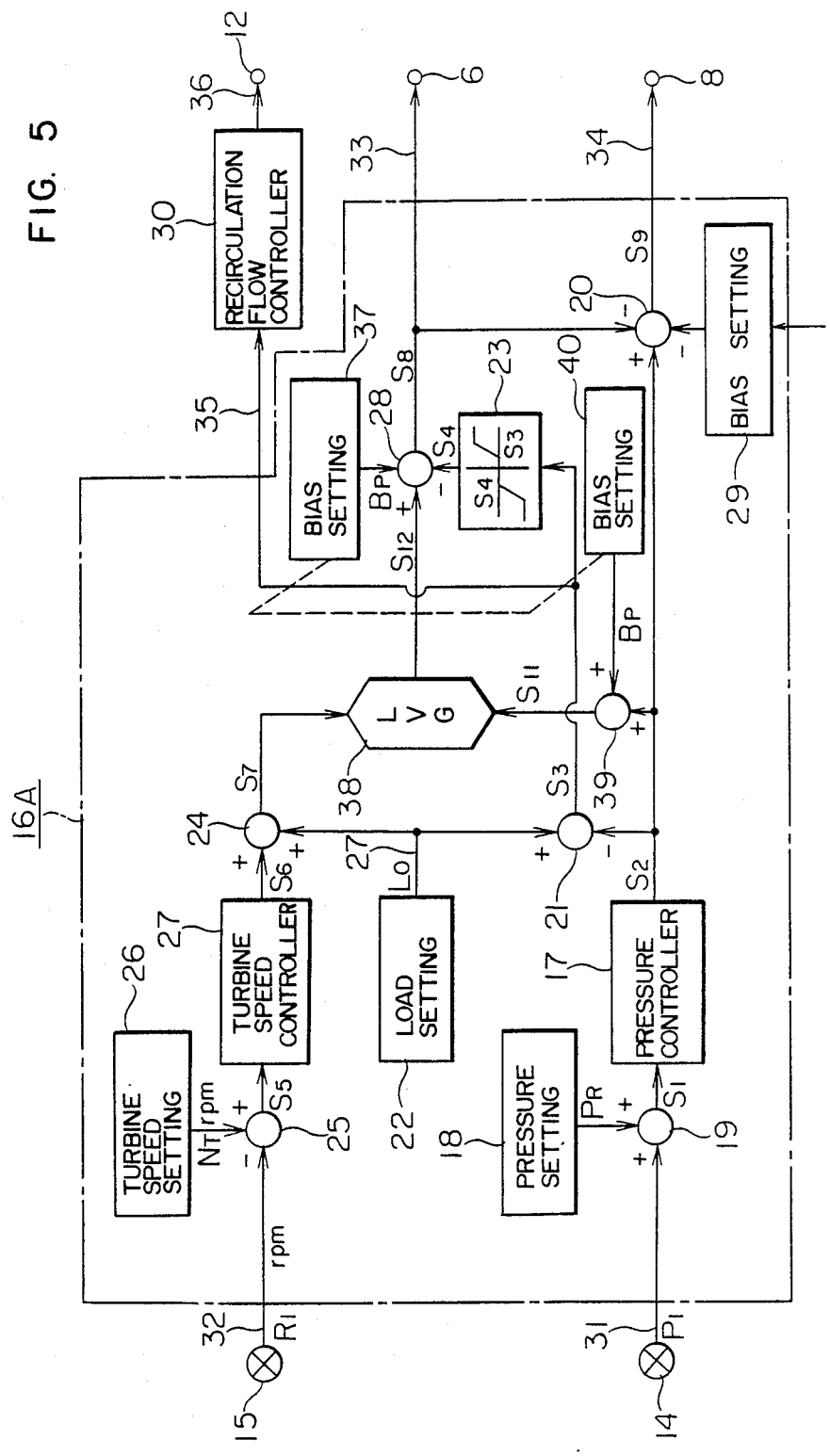
FIG. 5 shows in a block diagram a control apparatus according to another embodiment of the invention.

FIG. 5 shows an arrangement of a control apparatus 16A according to another embodiment of the invention which is also designed to be employed in the BWR power plant system such as shown in FIG. 1. For the convenience of description, the like components of the control apparatus 16A as those of the aforementioned control apparatus 16 shown in FIG. 2 are denoted by like reference symbols. This control apparatus 16A differs from the one 16 in that a low value gate circuit 38, an adder 39 and a bias setting unit 40 are additionally provided. Through the adder 39, the total steam flow demand signal $S_2$ is added with the steam flow demand bias signal $B_P$ outputted from the bias setting unit 40, whereby a signal $S_{11}$ is produced to be supplied to the low value gate circuit 38 which is so arranged as to select the lower value signal from the load demand signal $S_7$ and the signal $S_{11}$, the selected signal being outputted as a signal $S_{12}$. The adder 28 determines a deviation between the signal $S_{12}$ and the signal $S_4$ outputted from the dead-band limiter 23, whereby the deviation is outputted as the turbine control valve opening demand signal $S_8$.

According to the instant embodiment, the steam flow demand bias signal $B_p$ has such a value that the signal $S_{11}$ outputted from the adder 39 has a magnitude differing significantly from that of the load demand signal $S_7$, which value may be selected positive or negative. When the signal $S_p$ is positive, the low value gate circuit 38 always selects the load demand signal $S_7$, whereby the governor-free operation is carried out as in the case of the embodiment described hereinbefore in conjunction with FIG. 2. To the contrary, when the steam flow demand bias signal $B_p$ is selected to have a negative value, the low value gate circuit 38 always selects the output signal $S_{11}$ of the adder 39, as the result of which the ordinary load following control operation is carried out with preference put on the reactor pressure control, in place of the governor-free operation. In the case of the latter operation, the signal $-B_p$ is produced by the bias setting unit 37 to cancel the bias signal $+B_p$ superposed on the total steam flow signal $S_2$ and applied to the adder 28. To this end, the bias setting unit 37 is so arranged as to produce the signal $-B_p$ only when the bias setting unit 40 sets the negative bias and otherwise produce the zero output.

Figure 6:
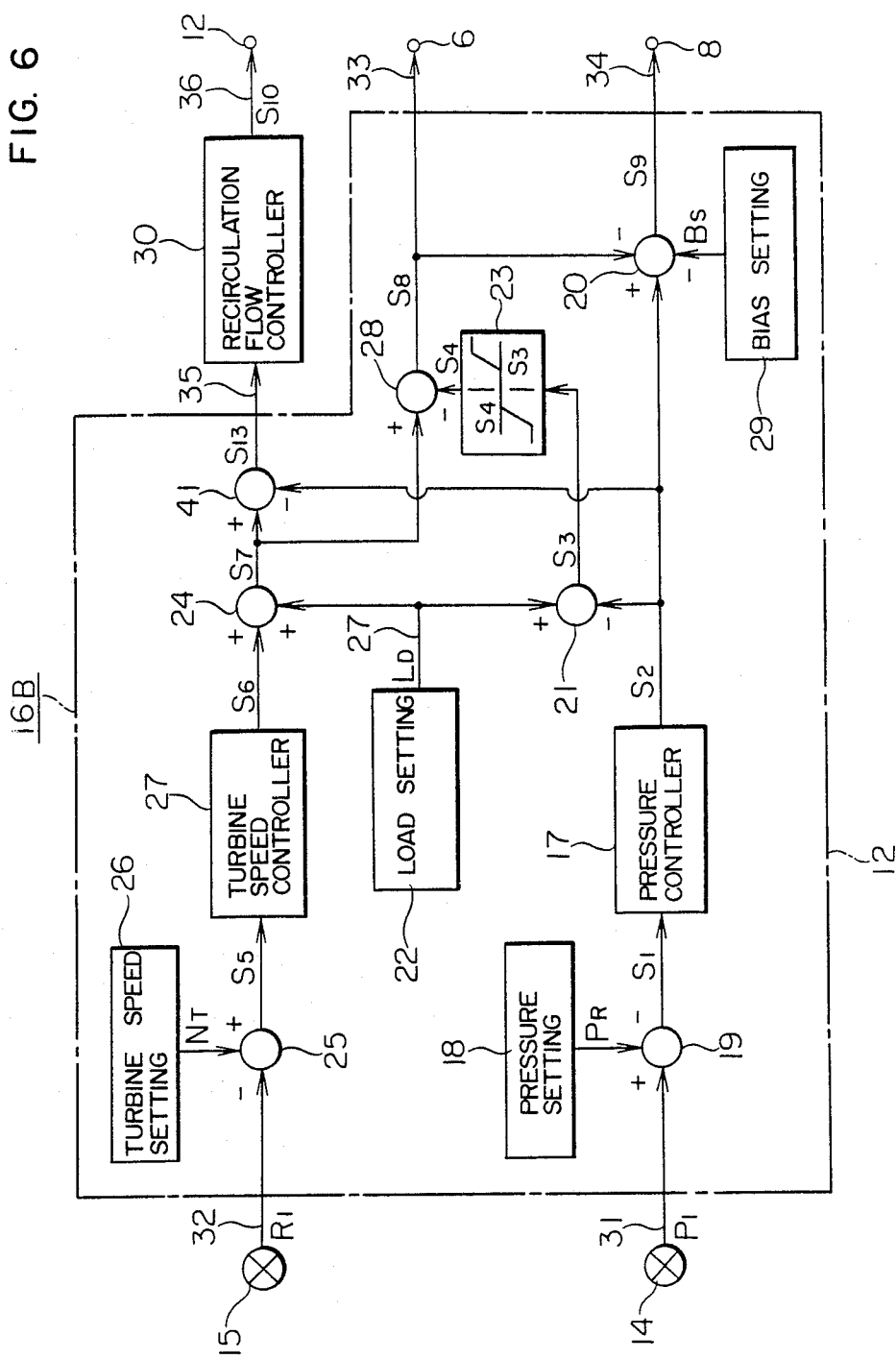
FIG. 6 shows in a block diagram a control apparatus according to still another embodiment of the invention.

Another embodiment of the control apparatus 16 is shown in FIG. 6. The control apparatus according to the instant embodiment and denoted by 16B is of a structure substantially identical with that of the control apparatus 16 except that a load following signal $S_{13}$ is produced by an adder 41 to be inputted to the recirculation flow controller 30. More specifically, the adder 41 is supplied with the total steam flow demand signal $S_2$ and the load demand signal $S_7$ to determine the difference between these input signals, which difference is outputted as the deviation signal $S_{13}$. With such arrangement, control can be so performed that the generator output and the reactor power are harmonically coordinated with each other. The embodiment shown in FIG. 6 can also realize the governor-free operation.

Figure 7:
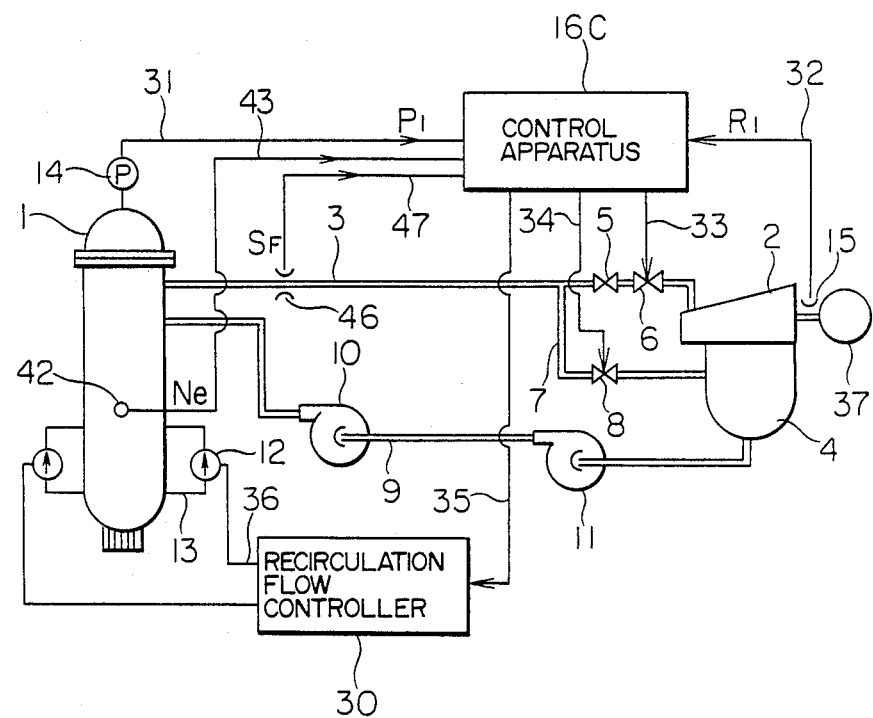
FIG. 7 is a view showing a general system arrangement of a boiling water reactor (PWR) plant to which the invention can be applied.
Figure 8:
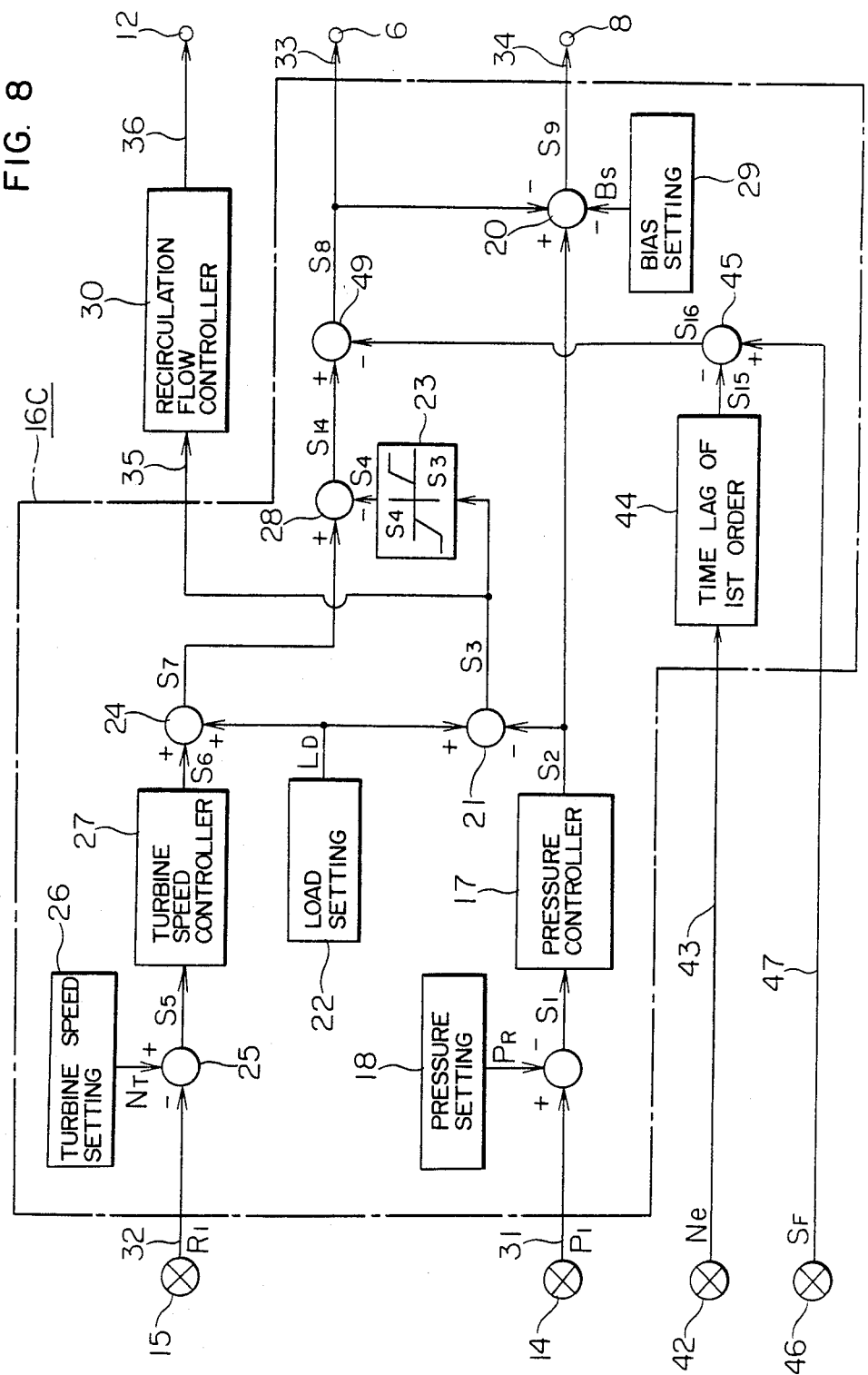
FIG. 8 is a view showing in a block diagram details of the control apparatus employed in the plant shown in FIG. 7.

A further embodiment of the control apparatus according to the invention applied to the BWR power plant will be described with reference to FIGS. 7 and 8. In the case of the instant embodiment, a neutron detector 42 disposed in the core within the reactor vessel 1 is electrically connected to the control apparatus denoted by 16C by a wiring conductor 43, and a steam flow meter 46 installed in the main steam pipe 3 is connected to the control apparatus 16C by a wiring conductor 47. The control apparatus 16C differs from the control apparatus 16 shown in FIG. 2 in that the former includes a time lag element 44 of first order and adders 45 and 49, as is shown in FIG. 8.

Operations of the instant embodiment which differ from that of the control apparatus 16 shown in FIG. 2 will be described below. Since a neutron flux signal Ne produced by the neutron detector 42 suffers fine and rapid fluctuations, this signal Ne is first supplied to the first order time lag element 44 to attenuate the fluctuations, and the resulting signal $S_{15}$ is applied to an input of the adder 45 as a signal representative of the reactor power. The adder 45 has the other input supplied with a main steam flow signal $S_F$ produced by the steam flow meter 46 (representative of the generator output at the time when the bypass flow is zero) to determine the difference between the signals $S_{15}$ and $S_F$, whereby the difference is outputted as a reactor power mismatch signal $S_{16}$. This signal $S_{16}$ is supplied to an input of the adder 49 where it is correctively combined with a correcting load demand signal $S_{14}$ to be outputted as the control valve opening demand signal $S_8$. In this sense, the adder 49 constitutes also a correcting means. The correcting load demand signal $S_{14}$ is prepared by the adder 28 by correcting the load demand signal $S_7$ with the signal $S_4$. The opening degree of the turbine control valve 6 is controlled in dependence on the control valve opening demand signal $S_8$.

Through the adder 20, the valve opening bias signal $B_s$ and the control valve opening demand signal $S_8$ are subtracted from the total steam flow demand signal $S_2$, whereby a bypass valve opening demand signal $S_9$ is produced.

In this way, the stability of the reactor pressure control and the reactor power control can be further enhanced by feeding back the reactor power mismatch signal $S_{15}$ as the control signal for the turbine control valve 6. More specifically, when the neutron flux tends to increase, the reactor pressure is decreased by increasing the main steam flow to thereby make effective a negative void reactivity action in which the void is increased to decrease the neutron flux. Thus, the increasing in the neutron flux can be effectively suppressed. As a consequence, when the reactor pressure tends to decrease because of the increasing in the main steam flow, a suppressing action takes place to prevent the reactor pressure from being lowered by suppressing the increasing of the main steam flow. Further, since the stabilizing feed-back feature according to the invention is based on the control of the reactor pressure, the control operation is accompanied with no delay in response, bringing about no instability or fluctuation in the reactor power.

Figure 9:
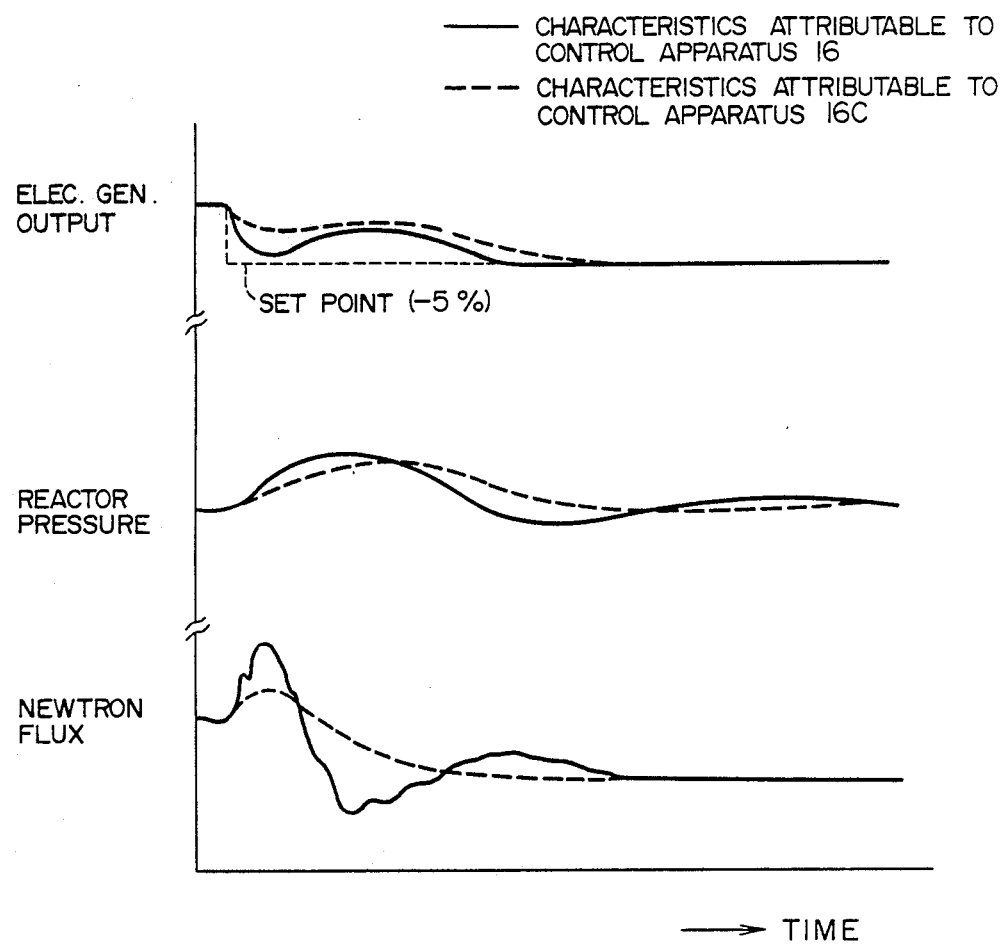
FIG. 9 is a view for illustrating graphically the control characteristics of the control apparatus shown in FIG. 8 in the governor-free operation comparatively with those of the control apparatus shown in FIG. 2.

FIG. 9 is a view graphically illustrating the control characteristics of the system in which the control apparatus 16 is employed, comparatively with those of the system in which the control apparatus 16C shown in FIG. 8 is employed. The solid curves represent the characteristics of the control apparatus 16 in which the feed-back of the reactor power mismatch signal $S_{16}$ is not adopted, while broken line curves represent the characteristics of the control apparatus 16C in which the feed-back control of the mismatch signal $S_{16}$ is adopted. As will be seen from the solid line curves, in the case of the control apparatus in which the feedback of the reactor power mismatch signal $S_{16}$ is not adopted, the change of the load setting point by $-5\%$ results in that the neutron flux increases steeply in the initial response phase due to the void reactivity effect brought about by the increasing of the reactor pressure, being followed by the decreasing in the recirculation flow due to the fluctuation of the load following signal. In contrast, in the case of the control apparatus in which the feed-back function of the reactor power mismatch signal $S_{16}$ is incorporated, the lowering of the turbine control valve opening demand signal is suppressed by the increasing of the neutron flux in the initial phase, whereby the fluctuation of the reactor power and the neutron flux in the initial phase can be reduced, although the response speed of decreasing the output of the electric generator is low, as indicated by the broken line curves.

Figure 10:
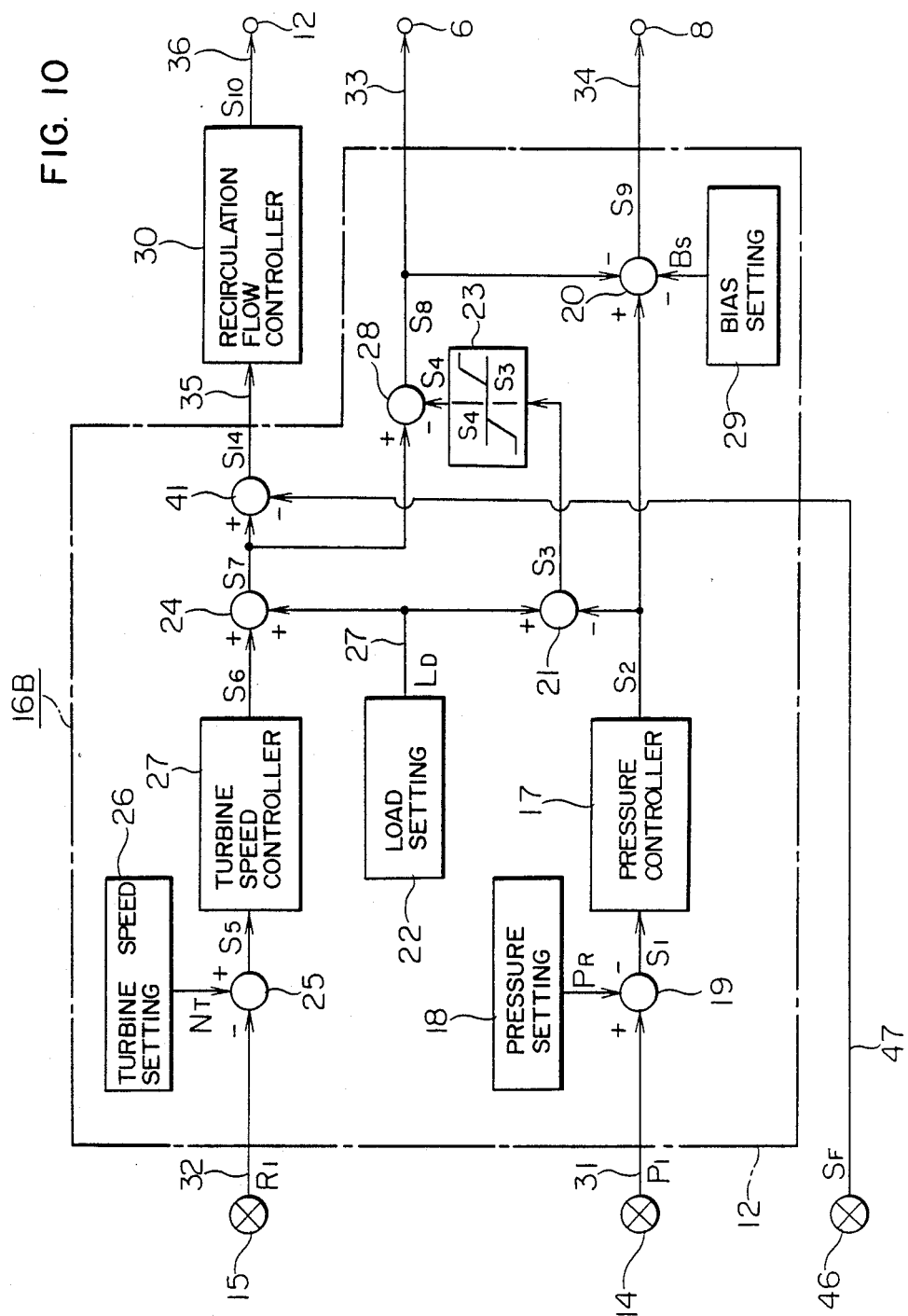
FIG. 10 is a view showing in a block diagram a control apparatus according to a further embodiment of the present invention.

FIG. 10 shows yet another embodiment of the invention. According to this embodiment, a steam flow meter 46 is installed in the main steam pipe 3, as is with the case of the system shown in FIG. 7. The main steam flow signal $S_F$ produced by the steam flow meter 46 is applied to the adder 41 to determine the deviation thereof relative to the load demand signal $S_7$, the resulting deviation signal $S_{14}$ being utilized for controlling the recirculation flow control apparatus 30.

Since the purpose of the recirculation flow is to control the reactor power, it is necessary to perform the control on the basis of the main steam flow $S_F$ corresponding to the reactor power. Further, since the objective of the control effected by the control apparatus according to the invention is the output of the electric generator, it is not only practical but also can ensure the stability to perform the control of the recirculation flow on the basis of the deviation signal $S_{14}$ between the load demand signal $S_7$ representative of the quantity related to the generator output and the main steam flow signal $S_{47}$ representative of the quantity related to the reactor power, in order to secure the matching between the generator output and the reactor power.

In the foregoing description made in conjunction with FIGS. 1, 5, 6 and 10, it has been assumed that the respective control apparatus are employed in the BWR power plant. It should however be understood that the control apparatus shown in FIGS. 1, 5, 6 and 10 can equally be employed in the PWR power plant as well as the thermal power plant. Further, it should be appreciated that the pressure gauge 14 for measuring the pressure within the nuclear pressure vessel 1 as shown in FIG. 1 is adapted to measure the steam pressure within the steam generator (or the steam pressure within the main steam pipe) in the case of the PWR power plant or the steam pressure within the boiler (or the steam pressure within the main steam pipe) in the case of the thermal power plant. The recirculation pump (reactor circulating pump) 12 constituting the fine adjusting means of the reactor power shown in FIG. 1 may be replaced by the means for adjusting concentration of the liquid poison in the case of the PWR power plant, while it is a governor adjusting means in the case of the thermal power plant. consequently, the recirculation flow controller 30 is replaced by the means for controlling the liquid poison concentration adjusting means and the governor adjusting means in the case of the PWR power plant and the thermal power plant, respectively.

As will be now appreciated, according to the teachings of the invention, the governor-free operation can be realized in a much facilitated manner. Besides, even when a great load change demand should arise in the course of the governor-free operation, fluctuations in the steam pressure and the neutron flux can be effectively suppressed, whereby stabilization thereof can be achieved within a short time.

What is claimed is:

1. A control apparatus for an electric power generating plant which includes a steam generator, a turbine, a main steam pipe for supplying steam generated in said steam generator to said turbine, a steam flow control valve installed in said main steam pipe for controlling the speed of said turbine, a condenser for condensing steam discharged from said turbine, a bypass pipe connected between said condenser and said main steam pipe at a location upstream of said steam flow control valve for introducing steam from said main steam pipe to said condenser, a bypass valve installed in said bypass pipe, feed water means for introducing feed water to said steam generator from said condenser, an electric generator coupled to said turbine, a pressure gauge for detecting steam pressure generated in said steam generator, a tachometer for detecting the rotating speed of said turbine, and a load setting unit for producing a load setting signal for said electric generator; said control apparatus further comprising:
- a pressure controller for producing a first control signal to control said bypass valve on the basis of the output signal of said pressure gauge;
- a turbine speed controller for producing a a load change demand signal on the basis of the output of said tachometer;
- an adder for producing a second control signal to control said turbine speed on the basis of adding said load setting signal to said load change demand signal; and
- correcting means for producing a third control signal to control the opening degree of said steam flow control valve by correcting said second control signal on the basis of said first control signal and said load setting signal so that fluctuation in the steam pressure generated in said steam generator is suppressed.

2. A control apparatus for an electric power generating plant according to claim 1, wherein said correcting means includes a correcting signal producing circuit outputting a correcting signal on the basis of said first control signal and said load setting signal and a first adder for adding said correcting signal to said second control signal.

3. A control apparatus for an electric power generating plant according to claim 2, wherein said correcting signal producing circuit has such a dead-band characteristic that said correcting signal is prevented from being produced so long as said first control signal lies within a predetermined range.

4. A control apparatus for an electric power generating plant according to claim 1, further comprising means for selecting one of said first and second control signals, wherein said correcting means corrects the control signal selected by said selecting means on the basis of said first control signal.

5. A control apparatus for an electric power generating plant according to claim 4, wherein said selecting means includes a second adder which serves to add to said first control signal either a positive or negative signal of a predetermined value so that the resulting signal has a difference of sufficiently large magnitude relative to said second control signal, and a low value select circuit for comparing the output signal of said second adder with said second control signal to select either one of them which has a lower value.

6. A control apparatus for an electric power generating plant which includes a steam generator, a turbine, a main steam pipe for supplying steam generated in said steam generator to said turbine, a steam flow control valve installed in said main steam pipe for controlling the speed of said turbine, a condenser for condensing steam discharged from said turbine, a bypass pipe connected between said condenser and said main steam pipe at a location upstream of said steam flow control valve for introducing steam from said main steam pipe to said condenser, a bypass valve installed in said bypass pipe, feed water means for introducing feed water to said steam generator from said condenser, an electric generator coupled to said turbine, a pressure gauge for detecting steam pressure generated in said steam generator, and a tachometer for detecting the rotating speed of said turbine; said control apparatus further comprising:
- a pressure controller for producing a first control signal to control said bypass valve on the basis of the output signal of said pressure gauge;
- a turbine speed controller for producing a first control signal to control said bypass valve on the basis of the output of said tachometer;
- correcting means for producing a third control signal to control the opening degree of said steam flow control valve by correcting said second control signal on the basis of said first control signal so that fluctuation in the steam pressure generated in said steam generator is suppressed; and
- steam generator output control means for controlling the output of said steam generator on the basis of at least said first control signal.

7. A control apparatus for an electric power generating plant according to claim 6, wherein said steam generator is constituted by a boiling water nuclear reactor, and said steam generator output control means is constituted by recirculation flow control means.

8. A control apparatus for an electric power generating plant according to claim 6, wherein said steam generator output control means is controlled on the basis of the difference between said first control signal and said second control signal.

9. A control apparatus for an electric power generating plant according to claim 7, further including a neutron detector disposed in a reactor core of said boiling water nuclear reactor, wherein said recirculation flow control means is controlled on the basis of a difference signal between said second control signal and the output signal of said neutron detector.

10. A control apparatus for an electric power generating plant which includes a steam generator, a turbine, a main steam pipe for supplying steam generated in said steam generator to said turbine, a steam flow control valve installed in said main steam pipe for controlling the speed of said turbine, a condenser for condensing steam discharged from said turbine, a bypass pipe connected between said condenser and said main steam pipe at a location upstream of said steam flow control valve for introducing steam from said main steam pipe to said condenser, a bypass valve installed in said bypass pipe, feed water means for introducing feed water to said steam generator from said condenser, an electric generator coupled to said turbine, a pressure gauge for detecting steam pressure generated in said steam generator, and a tachometer for detecting the rotating speed of said turbine; said control apparatus further comprising:
- a pressure controller for producing a first control signal to control said bypass valve on the basis of the output signal of said pressure gauge;
- a turbine speed controller for producing a first control signal to control said bypass valve on the basis of the output of said tachometer; and
- correcting means for producing a third control signal to control the opening degree of said steam flow control valve by correcting said second control signal on the basis of said first control signal so that fluctuation in the steam pressure generated in said steam generator is suppressed;
- wherein said steam generator is constituted by a boiling water nuclear reactor, further including a neutron detector disposed in a reactor core of said nuclear reactor for detecting neutrons, a steam flow meter for detecting steam flow in said main steam pipe, and a third detector for determining a difference signal between the output signal of said neutron detector and the output signal of said steam flow meter, said second control signal being corrected with said difference signal so as to suppress fluctuation in neutron flux in said reactor core.

11. A control apparatus for an electric power generating plant according to claim 10, further including a circuit incorporating a time lag element of first order, said circuit being inserted in a line interconnecting said neutron detector and said third adder.

* * * * *